United States Patent Office.

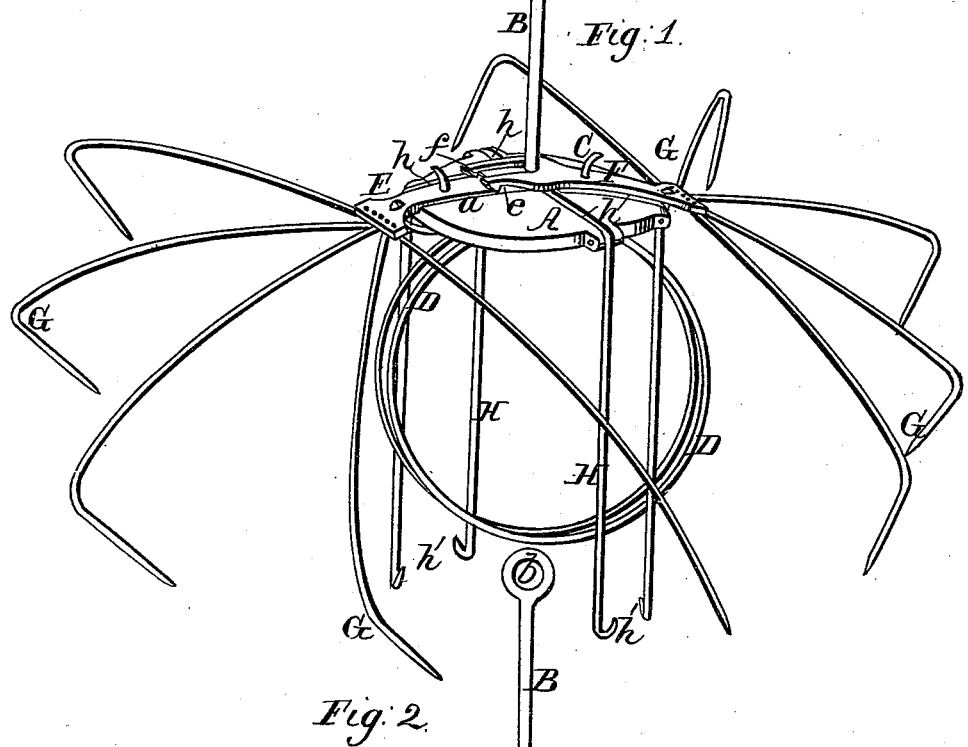
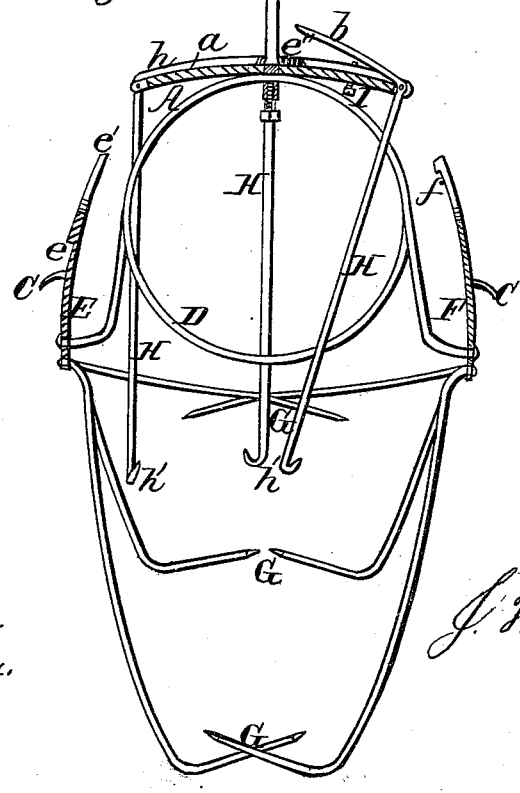

JAMES W. BAGBY, OF NORTHCUTT'S STORE, KENTUCKY.

Letters Patent No. 94,173, dated August 31, 1869.

IMPROVEMENT IN ANIMAL-TRAP.

The Schedule referred to in these Letters Patent and making part of the same.

*To whom it may concern:*

Be it known that I, JAMES W. BAGBY, of Northcutt's Store, Boone county, Kentucky, have invented a new and useful Animal-Trap; and I hereby declare the following to be a full, clear, and exact description thereof, reference being had to the accompanying drawings, making part of this specification.

My invention relates to a form of animal-trap, capable of being placed and becoming effective in any position, and of being approached and entered on any side by the prey, while escape is impossible.

Figure 1 is a perspective view of my trap, in its open or "set" condition.

Figure 2 is a vertical section of the same, in its closed or sprung condition.

A is a plate, having a stem, B, terminating in an eye, $b$.

Fastened to the under side of the plate, is a spring-coil, D, whose two extremities are fastened to two seres or catches, E F, of which one, E, occupies, when set, a groove, $a$, in the top of the plate, and is overlapped by F, which has a hook, $f$, on its under side, that, in the set condition, engages with a hook, $e$, on the upper side of E.

In the drawings, the spring is shown as being formed of two coils, but it is evident that a greater or less number may be employed, if desired.

Projecting from each sere or catch, is a series of hooks, G, which, on the liberation of the catches E F, as hereafter described, suddenly collapse with their points toward a common centre, (as in fig. 2,) and impale whatever is within their range.

The springing of the trap is effected by means of one or more triggers, H, hinged to and depending from the plate A, and having counter-arms $h$, whose ends, in the setting of the trap, are engaged under the upper catch F.

The triggers terminate below in customary hooks, $h'$, for the bait.

I is a small set-screw, which projects upwardly through the plate A, and impinges against the under side of the catch F. The object of this set-screw is to permit of the upper catch being so adjusted as that its hook $f$ may engage, to a greater or less extent, with the one, $e$, of the lower catch E.

The catch-plate E has bevelled ends, $e'$, which, by engaging in a suitable recess, $e''$, in the plate A, (when the trap is set,) prevent the catch-plate E rising with the catch-plate F when the trap is sprung.

It will be seen that the trap may be suspended by the eye $b$, or placed in any vertical, oblique, or inverted position, and, without interfering with its functions, have its parts so hidden by leaves, or other natural objects, as to disarm suspicion.

Handles, C, enable the catches to be brought together for setting.

I claim herein as new, and of my invention—

1. The arrangement of plate A, stem B $b$, spring-coil D, catches E F, hooks G, and triggers H, substantially as set forth.

2. In combination with the described elements of the preceding clause, the set-screw I, for the purpose herein explained.

In testimony of which invention, I hereunto set my hand.

JAS. W. BAGBY.

Witnesses:
GEO. H. KNIGHT,
JAMES H. LAYMAN.